April 28, 1964     B. STERNLICHT     3,131,004
YIELDABLE SHOE BEARING
Filed Oct. 12, 1961
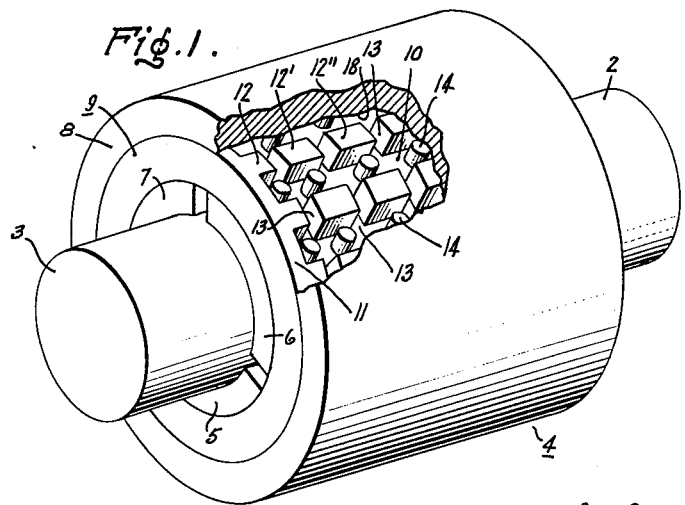
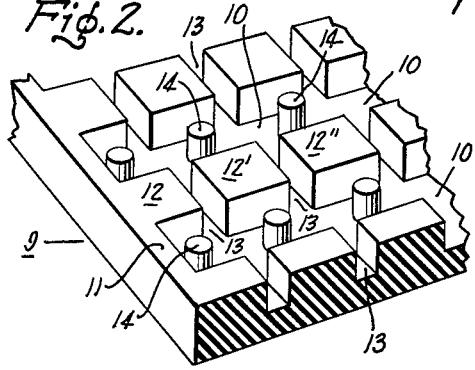
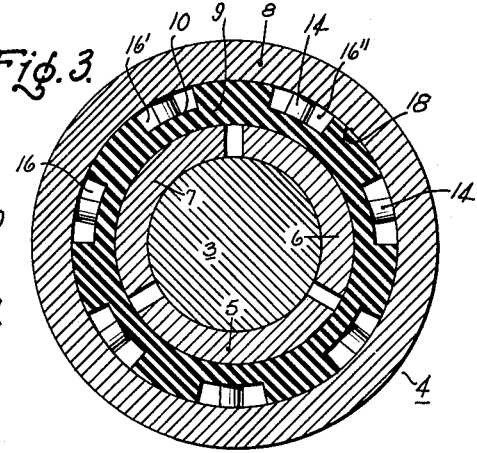
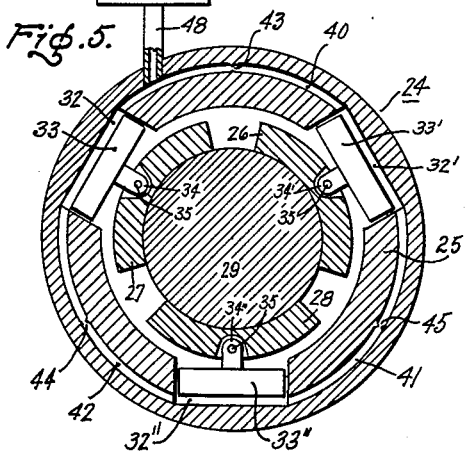
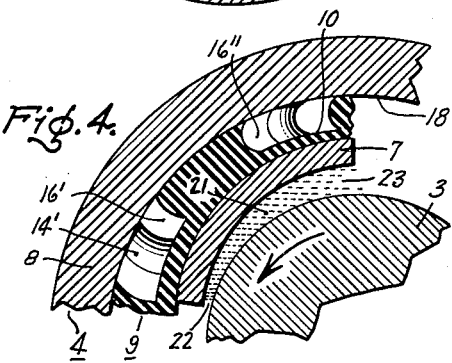
Inventor
Beno Sternlicht
by Paul A. Frank
His Attorney

United States Patent Office 3,131,004
Patented Apr. 28, 1964

3,131,004
YIELDABLE SHOE BEARING
Beno Sternlicht, Schenectady, N.Y., assignor to General Electric Company, a corporation of New York
Filed Oct. 12, 1961, Ser. No. 144,654
6 Claims. (Cl. 308—73)

The present invention relates to yieldable shoe bearings, and more particularly, to yieldable shoe bearings having means for attenuating operating noise.

In rotating machinery, the rotor usually is a major source of noise generation. The noise which may be caused by vibration in the rotor is usually dispersed through the bearings to the bearing pedestals and to adjacent members. The nature of the vibration and noise may be synchronous whirl, which is orbital rotor axis movement due to unbalance in the rotor, shock, external forces acting on the rotor, etc. The vibration may be also caused by instability in the rotor, especially when the rotor is not fully loaded, in which case a half-frequency whirl may exist. Another cause of vibration is resonant whip which is an instability excited by the first rotor bending critical speed of the system occurring at twice the first rotor bending critical speed. Since the noise is generated substantially by the rotor, it is desirable to attenuate such noise at the bearings or as close to the bearing as physically possible.

In my United States Patent 3,110,526, granted November 12, 1963, and assigned to the assignee of the present application, there is disclosed a bearing construction including bearing means associated with a plurality of circumferentially located chambers which are connected by suitable passages, each chamber having a yieldable wall associated with the bearing means so that the deflection of the yieldable wall and the consequent forces applied to the fluid in the chambers causes circumferential movement of the fluid to dampen vibration and noise. In my copending application, the stiffness of the bearing may be maintained at a desired level to control resonant whip by the utilization of resilient means located both within and without the chambers for supporting the bearing means.

In the construction in my copending application, the noise attenuating means is located immediately adjacent the bearing means and provides support for the bearing means in a manner that the vibrating energy generated in the rotor is transmitted to the bearings at which point the vibration is substantially attenuated. As noted above, it is desirable to attenuate noise by damping rotor vibration as near to the rotor as possible, ideally in the bearing itself. This may be achieved in certain bearings by providing inherent stability in the bearing construction. For example, it is well known that any bearing design which produces a resultant supporting force in line with the rotor displacement, that is, a force that is strictly radial, will generally tend to be stable. An example of a construction utilizing this design criterion is the segmented arcuate shoe bearing which comprises pivotally mounted shoes wherein the hydrodynamic forces become balanced on each shoe with an equal moment being applied to both ends of the shoe around the pivot point. In this type construction, all the forces acting on the bearing shoes may be deemed to be passing through the pivot points and the direction of the reactive force of the shoes is through the rotor axis.

It is recognized that after the equilibrium of moments on each shoe has been achieved with respect to a particular instantaneous load, the load may vary, in which case, oscillation of the bearing shoe may occur and a varying load is applied to the pivot point. This varying load condition at the pivot point may generate noise which is transmitted to adjacent structures and members.

The chief object of the present invention is to provide an improved noise attenuating structure for supporting rotating members.

An object of the invention is to provide an improved pivoted shoe bearing.

Another object of the invention is to provide an improved bearing having noise attenuating features.

A further object of the invention is to provide a shoe bearing construction having yieldable support means for the shoes.

A still further object of the invention is to provide a damping construction associated with a shoe bearing for attenuating noises generated by rotor vibration.

These and other objects of my invention may be more readily perceived from the following description.

Briefly stated, the present invention includes a rotor journal and a plurality of arcuate shoe bearing members which engage the journal. The arcuate bearing members extend circumferentially around the bearing and each member has associated therewith yieldable supporting means permitting radial movement of the member with respect to the journal.

The attached drawings illustrate preferred embodiments of my invention, in which:

FIGURE 1 is a perspective view, partially in section, of an apparatus employing the present invention;

FIGURE 2 is an enlarged, developed, fragmentary view of the resilient member shown in FIGURE 1;

FIGURE 3 is a sectional view taken in a plane normal to the rotor axis shown in FIGURE 1;

FIGURE 4 is an enlarged fragmentary, sectional view of the bearing construction shown in FIGURE 3; and FIGURE 5 is a sectional view taken through a plane normal to the rotor axis of an apparatus employing another embodiment of the invention.

Referring now to the drawings in more detail, there is shown in FIGURE 1 a perspective view of a bearing construction utilizing the present invention wherein a rotor 2 having journal portion 3 is supported by bearing construction 4. Bearing construction 4 may include a plurality of shoe members 5, 6, and 7 which are arcuate members having bearing surfaces adapted to engage journal 3. Enveloping shoe members 5, 6, and 7 may be outer annular member 8 which may be the rigid portion of an apparatus, for example, the bearing pedestal of a particular machine. Located between the shoe bearings and outer member 8 may be resilient member 9 which is partially shown in the sectional portion of FIGURE 1. In addition to considering FIGURE 1 reference is made to FIGURE 2 which is an enlarged, fragmentary view of the resilient member utilized in FIGURE 1. From FIGURES 1 and 2, it can be seen that resilient member 9 may comprise base portion 10 which extends substantially around the journal and is in intimate contact with shoe members 5, 6, and 7. Extending from base portion 10 may be end boundary members 11 and a plurality of partition members 12, 12', 12" which are circumferentially spaced around the rotor to define substantially with the end boundary portions 11, a plurality of chambers 16, 16', 16", etc. These circumferentially located chambers may be suitably connected, for example, by means of a plurality of passages 13 so that fluid in chambers 16, 16', 16", etc., may be circulated between the chambers in a general circumferential direction. It is extremely desirable to provide the bearing shoes with certain noise attenuating means, specifically, fluid chambers connected by flow restraining means. It is also realized that with increased flexibility, the critical speed of the system will decrease, in which case, with conventional plain cylindrical journal bearings the phenomenon known as resonant whip may become a problem at speeds greater than twice the first rotor bending critical speed of the system. With pivoted shoe bearings, the resultant lubricant film forces are radial and cannot cause whirling motion and instability.

To provide stiffness in the resilient member construction, there may be provided in each of the chambers 16, 16', 16'', etc., a plurality of resilient post members 14 fabricated of the same material as the resilient member. These post members engage surface 18 of member 8 which defines the outer boundary member of the individual chambers. Deformation of the chambers and the compression of the fluid therein is substantially resisted by post members 14. Restraining post members 14 are assisted by end boundary portions 11 and the partition portions 12, 12', 12'' which provide resilient support externally of the chambers. The geometric size and material properties of the posts, boundary, and partition portions may be utilized to determine the bearing stiffness and its influence on the critical speed of the system.

In the operation of the present invention, a liquid such as a dimethyl silicone, which is a slightly compressible fluid, may be placed in chambers 16, 16', 16'', etc., as shown in FIGURE 3. These chambers are circumferentially located about the bearing and are placed in communication with one another through the previously mentioned passages 13. By this construction any deflection of the shoes as a result of orbital movement of the rotor causes compression of the resilient member, consequent distortion of chamber 16, and the application of force on the fluid located therein. The fluid is urged circumferentially through passage means 13 to adjacent chambers and if these chambers are also compressed, the fluid is further transmitted circumferentially. It will be appreciated that the damping qualities of the chamber constructions depend upon the fluid viscosity, the size of the chambers, and the flow restraining qualities of passages 13 in transmitting the fluid. In addition, thereto, the particular compressible character of the liquid also assists in noise attenuation.

The present invention, in addition to supplying resilient means having fluid chambers for noise attenuation and vibration damping, provides support to a bearing construction which is inherently stable. It is well known that a pivoted shoe bearing tends to be stable because the reaction force generated in each shoe is in a radial direction. Accordingly, since the shoe bearing is capable of oscillating movement to accommodate varying load conditions, it continually directs its load carrying capacity through the line of centers of the rotor. The present invention provides this feature by providing the conventional arcuate shoes and in addition thereto, the pivot points of the bearing shoes are not fixed in space. Recognizing that the shoe bearing in a conventional shoe bearing oscillates about its pivot point, and this pivot point is subjected to pulsating forces which are transmitted through the pivot point to adjacent equipment, the present invention yieldably or resiliently mounts the pivot point and the entire shoe by the construction shown in FIGURES 1, 2, and 3, so that the pulsating forces generated by the moving shoes are such that the damping qualities of the resilient member substantially attenuate noise and absorb the vibration energy.

In FIGURE 4, it can be seen that in the operation of the bearing construction shown in FIGURES 1, 2, and 3, an individual shoe, for example, shoe 7, forms with journal 3 of rotor 2 a small converging area in which the lubricant film hydrodynamically generates forces which support the rotor and because of the particular construction, the shoe will inherently stabilize the bearing operation by moving or pivoting to accommodate the changes in reaction force acting on the shoe. It will be appreciated that the shoe will therefore be urged to pivot about a hypothetical pivot point which is movable and whose position is determined by the character of the resilient member and the particular fluid utilized with the construction. It can be seen in FIGURE 4 that for a particular load condition, a wedge 21 of lubricant exists with the greatest pressure in area 22 and the smallest pressure in area 23. From this view, it can be seen chamber 16' is distorted greater than chamber 16 and accordingly, the fluid in chambers 16 and 16' is transmitted circumferentially because of the compressive forces from shoe 7. In order to maintain the stiffness of the bearing support, it is noted that partitions 12, 12', 12'', etc., of the resilient member between chambers 16 and 16' are supporting the shoe, as are post members 14. In FIGURE 4, post member 14' is being buckled substantially greater than post 14 because of the greater deflection forces acting upon the resilient member in the area of chamber 16'.

From this construction, it is apparent that as a result of an orbital movement of rotor 2, there is imparted a general oscillating movement to shoe 7 which reacts against resilient member 9 and deflects member 9 as described above.

In FIGURE 5 there is shown another embodiment of the invention wherein a plurality of pistons and cylinders rather than a resilient member are utilized to support pivoted shoe bearings. In FIGURE 5, rotor 29 is supported by shoes 26, 27, and 28 which are pivotally mounted in bearing construction 24. Bearing construction 24 includes chambers 32, 32', 32'', which have pistons 33, 33', 33'' reciprocally mounted therein. These pistons have projections 34, 34', 34'' extending therefrom for pivotal connection to shoes 26, 27, and 28. Bearing support member 25 envelops said bearing shoes and houses the piston chambers.

From this construction, it is apparent that orbital movement of shaft 29 is accommodated by pivotal movement of the individual shoes around their pivot points in the manner of a conventional shoe bearing design. All bearing reaction forces pass radially through the axis of the rotor making the bearing construction substantially stable. It is also recognized that in a conventional shoe bearing construction, the radial forces may vary because the hydrodynamic supporting forces generated may vary due to changes in shoe orientation while accommodating the orbital movement of the shaft. As a result, the load may change continuously and a pulsating force may be transmitted to the pivot points.

In the present construction, the forces are transmitted to pivot points 35, supports 34, to pistons 33, 33', 33'' which are adapted to move in the chambers or cylinders 32, 32', and 32''. Chambers 32, 32', 32'' are filled with a suitable fluid, such as the previously identified silicone fluid. Movement of the pistons causes displacement of the fluid in a circumferential direction to adjacent chambers. In order to dampen the noise of the system, a plurality or orifices 43, 44, and 45 may be located in connecting passages 40, 41, and 42. These orifices 43, 44, and 45 restrains the movement of the fluid between the chambers and in this manner the construction dampens the noise generating forces from the rotor.

To change the stiffness of the bearing, the flow resistance of the system may be increased by having one of the passages connected to accumulator 49, wherein is located a reservoir 50 of liquid under pressure from a suitable compressed gas 51 also located therein. In the present embodiment, accumulator 49 is connected to passage 40 by line 48.

In operation of the system, compression of the liquid after it has been influenced by the previously described orifices, is ultimately reflected in accumulator 49. The mass of liquid 50 in the accumulator and the fluid pressure acting on the liquid forms a resistance to liquid flow which may be controlled and tailored to meet the needs of the system. By judicious sizing of the orifices, selecting suitable liquids, and applying predetermined pressures to the liquid, the particular damping qualities and the stiffness of the construction shown in FIGURE 5 may be maintained at a desired level.

The present invention recognizes that pulsating forces are imparted to the shoes in pivoted shoe bearings and these pulsating forces have noise generating qualities which are desirably attenuated. The attenuation is achieved by yieldably supporting the shoes to absorb noise generating forces acting thereon.

While I have described preferred embodiments of my invention, it will be understood that the invention is not limited thereto, since it may be otherwise embodied within the scope of the following claims.

What I claim as new and desire to secure by Letters Patent of the United States is:

1. In a bearing construction, the combination of a journal, a plurality of arcuate bearing members adapted to engage the journal, said bearing members being circumferentially spaced around the journal, means defining a plurality of chambers adapted for containing fluid and spaced circumferentially around the bearing members, connecting conduits between said chambers, said chambers each having a yieldable wall operatively associated with said bearing members whereby the compression of fluid within the chambers causes circumferential movement of the fluid to adjacent chambers.

2. In a bearing construction, the combination of a journal, a plurality of arcuate bearing members adapted to engage the journal, a rigid support member substantially enveloping said bearing members, a resilient member located between said bearing members and said rigid support member, said resilient member defining a plurality of circumferentially spaced chambers adapted for containing fluid and having connecting passages therebetween whereby compression of fluid in the chambers causes circumferential movement of the fluid to adjacent chambers.

3. In a bearing construction, the combination of a journal, a plurality of arcuate bearing members adapted to engage the journal, a rigid support member substantially enveloping said bearing members, a resilient member located between said bearing members and said rigid support member, said resilient member defining a plurality of circumferentially spaced chambers adapted for containing fluid and having connecting passages therebetween whereby compression of the fluid in the chambers causes circumferential movement of the fluid to adjacent chambers, and resilient means for supporting said chambers when the fluid therein is compressed.

4. In a bearing construction, the combination of a journal, a plurality of arcuate bearing members circumferentially located about said journal and operatively engaging said journal, a plurality of chambers adapted for containing fluid, piston means associated with each of said chambers and being pivotally connected to the arcuate bearing members, passage means for connecting adjacent chambers whereby movement of the pistons in response to bearing load causes circumferential movement of the fluid from the chambers through the passage means to adjacent circumferentially located chambers.

5. In a bearing construction, the combination of a journal, a plurality of arcuate bearing members circumferentially located about said journal and operatively engaging said journal, a plurality of chambers adapted for containing fluid, piston means associated with each of said chambers and being pivotally connected to said arcuate bearing members, passage means for connecting adjacent chambers whereby movement of the pistons in response to bearing load causes movement of the fluid in the chambers through the passage means to adjacent chambers, said passage means having flow restricting means.

6. In a bearing construction, the combination of a journal, a plurality of arcuate bearing members circumferentially located about said journal and operatively engaging said journal, a plurality of radially disposed chambers adapted for containing fluid, piston means associated with each of said chambers and being pivotally connected to said arcuate bearing members, passage means for connecting adjacent chambers whereby movement of the pistons in response to bearing load causes circumferential movement of the fluid from the chambers through the passage means to adjacent chambers, and means for supplying pressurized fluid to said passage means, said last mentioned means including an accumulator having a reservoir of pressurized fluid therein.

References Cited in the file of this patent

UNITED STATES PATENTS

| | | |
|---|---|---|
| 1,595,744 | Trumpler | Aug. 10, 1926 |
| 2,614,896 | Pierce | Oct. 21, 1952 |